United States Patent
Lee (10) Patent No.: US 8,471,975 B2
(45) Date of Patent: Jun. 25, 2013

(54) DISPLAY DEVICE

(75) Inventor: Jung Mok Lee, Suwon (KR)

(73) Assignee: LG Display Co., Ltd., Seoul (KR)

( * ) Notice: Subject to any disclaimer, the term of this patent is extended or adjusted under 35 U.S.C. 154(b) by 510 days.

(21) Appl. No.: 12/523,190

(22) PCT Filed: May 9, 2008

(86) PCT No.: PCT/KR2008/002640
§ 371 (c)(1),
(2), (4) Date: Jul. 15, 2009

(87) PCT Pub. No.: WO2008/143418
PCT Pub. Date: Nov. 27, 2008

(65) Prior Publication Data
US 2010/0066938 A1    Mar. 18, 2010

(30) Foreign Application Priority Data

May 23, 2007  (KR) .................. 10-2007-0050367
Jun. 20, 2007  (KR) .................. 10-2007-0060230

(51) Int. Cl.
*G02F 1/1333*    (2006.01)

(52) U.S. Cl.
USPC ............................................. 349/58

(58) Field of Classification Search
USPC ............................................. 349/58
See application file for complete search history.

(56) References Cited

U.S. PATENT DOCUMENTS

| 6,734,928 | B2 * | 5/2004 | Ito et al. | 349/58 |
| 7,128,459 | B2 * | 10/2006 | Igarashi et al. | 362/621 |
| 2005/0094052 | A1 * | 5/2005 | Sakurai et al. | 349/58 |
| 2007/0052880 | A1 * | 3/2007 | Lv et al. | 349/58 |
| 2007/0132909 | A1 * | 6/2007 | Oohira | 349/58 |
| 2007/0268425 | A1 * | 11/2007 | Jung | 349/58 |

FOREIGN PATENT DOCUMENTS

| CN | 1431646 A | 7/2003 |
| CN | 1661446 A | 8/2005 |
| CN | 1672832 A | 9/2005 |
| JP | 2000-147469 A | 5/2000 |
| KR | 10-2004-0097467 A | 11/2004 |
| KR | 10-2005-0068198 A | 7/2005 |
| KR | 10-2006-0083262 A | 7/2006 |

* cited by examiner

*Primary Examiner* — Richard Kim
(74) *Attorney, Agent, or Firm* — Birch, Stewart, Kolasch & Birch, LLP (57) ABSTRACT

Disclosed is a display device. A liquid crystal panel and a backlight assembly are fixed to a frame by using resin such as silicon, so that a slim and small-sized display device is realized.

17 Claims, 6 Drawing Sheets

DISPLAY DEVICE

TECHNICAL FIELD

The present embodiment relates to a display device.

A liquid crystal display (LCD) that is one of display devices represent low power consumption, a light weight, and a small volume.

BACKGROUND ART

A display device includes a liquid crystal panel that displays image information, and a backlight unit that provides light to the liquid crystal panel.

Since such a liquid crystal panel is a light receiving device that does not emit light by itself, the liquid crystal panel requires a backlight unit. Accordingly, the performance of a liquid crystal display mainly depends on the performance of a backlight unit as well as the liquid crystal panel.

The backlight unit comprises a backlight assembly, which includes a reflective sheet, a light guide plate, a prism sheet, a diffusion sheet, a protective sheet, and a light source, and a frame receiving the backlight unit.

The liquid crystal display is provided by coupling the backlight assembly and the liquid crystal panel to the frame.

DISCLOSURE OF INVENTION

Technical Problem

The embodiment provides a display device.

Technical Solution

According to the embodiment, a display device comprises a display part comprising at least one of a liquid crystal panel and a backlight assembly, a frame receiving the display part, and a fixing member disposed between the display part and the frame.

According to the embodiment, a display device comprises a backlight assembly comprising a light guide plate, an optical sheet, and a reflective sheet, and a frame formed with a sidewall to receive and fix the backlight assembly, in which at least one portion of the backlight assembly is fixed to the frame by using a fixing member.

Advantageous Effects

According to the present embodiment, a display device can be realized by fixing the display device to a frame using a fixing member including resin.

In addition, since the fixing member comprises synthetic resin or polymer resin, the display device can be protected from an external shock.

Further, the coupling force between the frame and the display device can be enhanced due to the fixing member.

MODE FOR THE INVENTION

Figure 1:
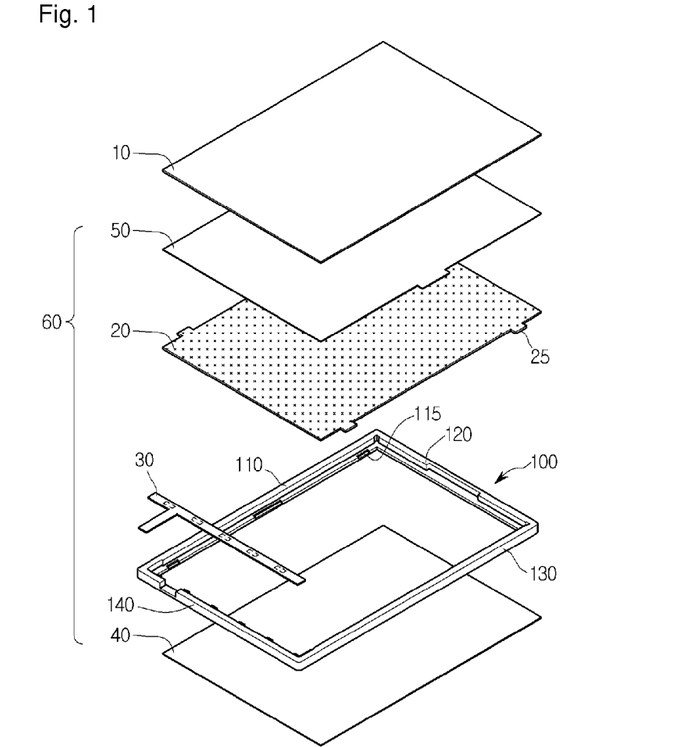
FIG. 1 is an exploded perspective view showing a display device according to the first embodiment.
Figure 2:
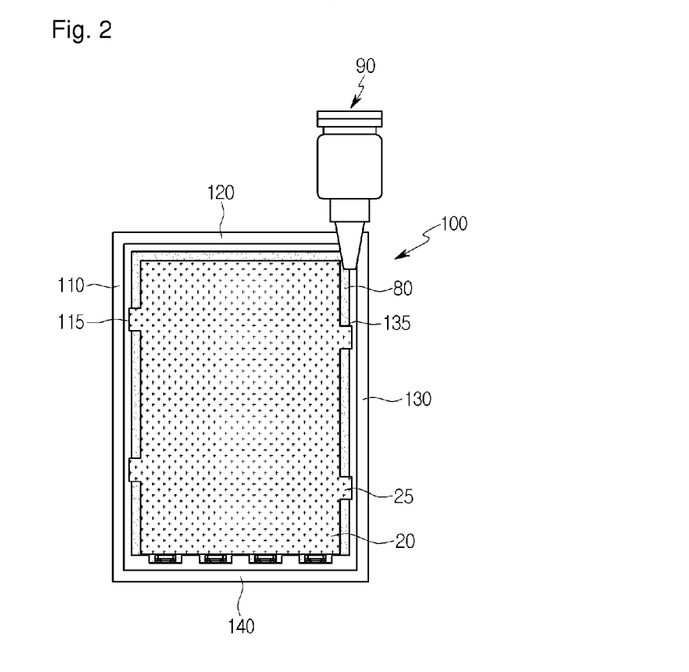
FIG. 2 is a plan view showing the coupling of a frame and a light of FIG. 1 guide plate of a backlight assembly.

FIG. 1 is an exploded perspective view showing a display device according to the first embodiment. FIG. 2 is a plan view showing the coupling of a frame and a light guide plate of a backlight assembly.

Referring to FIGS. 1 and 2, the display device comprises a liquid crystal panel 10, a backlight assembly 60, and a frame 100.

The liquid crystal panel 10, which displays image information, is formed by interposing a liquid crystal layer between a TFT substrate and a color filter substrate.

The backlight assembly 60 is installed at the rear surface of the liquid crystal panel 10 so that light can be supplied to the liquid crystal panel 10. The backlight assembly 60 includes a light emitting part 30, a light guide plate 20, an optical sheet 50, and a reflective sheet 40.

The light emitting part 30 includes a light emitting diode (LED) or a cold cathode fluorescent lamp (CCFL) to emit light to the light guide plate 20.

The light guide plate 20 receives the light emitted from the light emitting part 30 to uniformly disperse the light over the entire light emission area of a backlight. The light guide plate 20 is provided at the side surface with at least one protrusion 25 such that the light guide plate 20 is received in the frame 100.

The optical sheet 50 is attached onto the top surface of the light guide plate 20, and includes a lens sheet, a diffusion sheet, or a protective sheet.

The reflective sheet 40 is attached onto the bottom surface of the light guide plate 20. The reflective sheet 40 reflects light, which is leaked from the light guide plate 20 downward, toward the light emission area of the backlight.

The frame 100 receives or fixes at least one of the liquid crystal panel and the backlight assembly 60 therein or thereto. For example, the frame 100 includes polycarbonate resin, styrene resin, or synthetic resin such as poly(vinyl chloride) or polypropylene.

The frame 100 includes sidewalls 110, 120, 130, and 140. For example, the frame 100 employs four sidewalls such that the sidewalls form a square-type frame. Hereinafter, the four sidewalls are referred to as the first sidewall 110, the second sidewall 120, the third sidewall 130, and the fourth sidewall 140.

The first sidewall 110 faces the third sidewall 130. The second sidewall 120 faces the fourth sidewall 140. Accordingly, the first to the fourth sidewalls 110 to 140 are connected to each other in a closed loop shape. The first to fourth sidewalls 110 to 140 form a square-shape frame when viewed in a plan view.

The first and third sidewalls 110 and 130 may have grooves 115 and 135 in a position corresponding to protrusions 25 formed at the side surface of the light guide plate 20.

Accordingly, when the light guide plate 20 is coupled to the frame 100, the protrusions 25 of the light guide plate 20 are inserted into the grooves 115 and 135 of the frame 100 so that the light guide plate 20 may be fixed to the frame 100.

Figure 3:
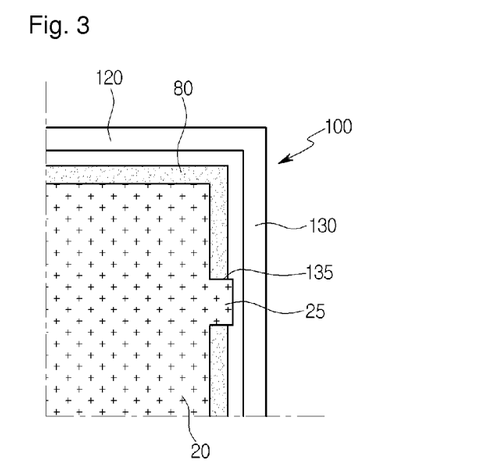
FIG. 3 is an enlarged view showing a portion of a display device shown in FIG. 2.

Referring to FIGS. 2 and 3, the light guide plate 20 may be fixed to the frame 100 by using a fixing member 80. The fixing member 80 may be resin. For example, the fixing member 80 may be a liquid adhesive agent such as synthetic resin or silicon resin.

Reference number 90 represents an injector of a liquid adhesive agent.

In order to fix the light guide plate 20 to the frame 100, the light guide plate 20 is positioned on the frame 100. Then, the protrusions 25 of the light guide plate 20 are inserted into the grooves 115 and 135 of the first and third sidewalls 110 and 130 of the frame 100 such that the light guide plate 20 is fixed to the frame 100.

A liquid adhesive agent including silicon resin is injected into a contact area between the frame 100 and the light guide plate 20. Then, the liquid adhesive agent is hardened so that the fixing member 80 is formed between the light guide plate 20 and the frame 100. In this case, the light guide plate 20 adheres to the frame 100.

Since the light guide plate 20 is fixed to the frame 100 by using the fixing member 80, the light guide plate 20 can be fixed to the frame 100 regardless of the thicknesses of the light guide plate 20 and the frame 100.

Accordingly, since the light guide plate 20 is coupled to the frame 100 by the fixing member 80, the light guide plate 20 can be stably coupled to the frame 100 even if the light guide plate 20 is thin.

In addition, even if the protrusions 25 and the grooves 115 and 135 are not formed in the light guide plate 20 and the frame 100, the light guide plate 20 is fixedly coupled to the frame 100 by using the fixing member 80.

Figure 4:
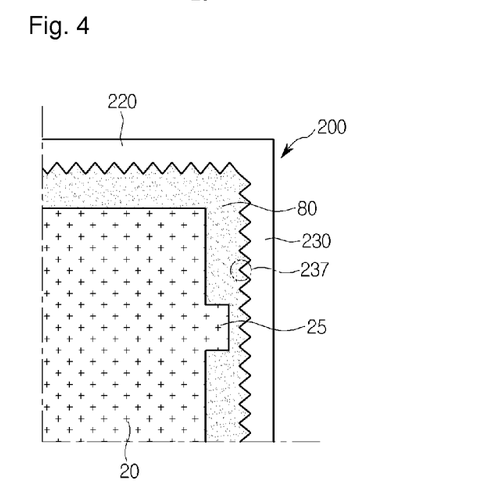
FIGS. 4 and 5 are enlarged views showing portions of a frame and a light guide plate having another shape according to the first embodiment.
Figure 5:
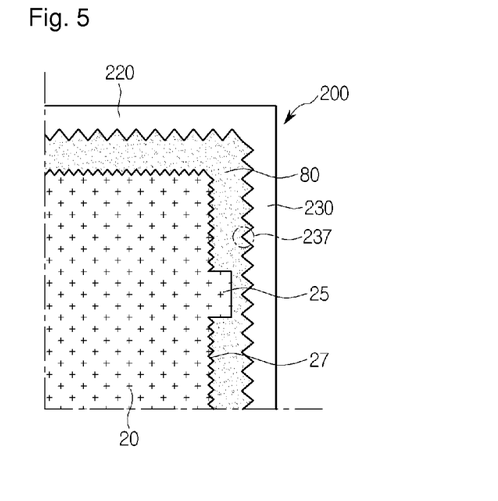

FIGS. 4 and 5 are views showing a frame and a light guide plate having another shape.

Referring to FIG. 4, a zigzag protrusion part 237 may be formed on one of sidewalls of a frame 200.

If the zigzag protrusion part 237 is formed on sidewalls 220 and 230 of the frame 200, a contact area between the frame 200 and the fixing member 80 is widened when the frame 200 is coupled to the light guide plate 20, so that the coupling force between the fixing member 80 and the frame 200 can be more enhanced.

Referring to FIG. 5, a protrusion part 27 is formed on the side surface of the light guide plate 20. In addition, the zigzag protrusion part 237 may be formed on at least one among the sidewalls of the frame 200.

If the zigzag protrusion parts 27 and 237 are formed on the side surface of the light guide plate 20 and the sidewall of the frame 200, a coating area of the fixing member 80 is widened when the light guide plate 20 is coupled to the frame 200. Accordingly, the coupling force between the light guide plate 20 and the frame 200.

Figure 6:
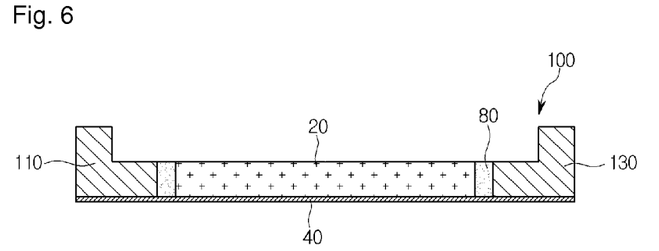
FIGS. 6 and 7 are sectional views showing the coupling of a light guide plate and a reflective sheet to a frame according to the first embodiment.
Figure 7:
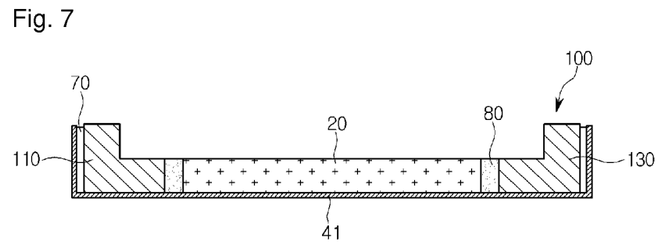

FIGS. 6 and 7 are a sectional view showing a reflective sheet when a light guide plate is coupled to a frame.

Referring to FIG. 6, when the light guide plate 20 is coupled to the frame 100, the reflective sheet 40 is fixedly coupled to the light guide plate 20 and the frame 200.

After the frame 100 is rested on the reflective sheet 40, the light guide plate 20 is coupled into the frame 100.

Thereafter, a liquid adhesive agent including resin is injected into the contact area between the frame 100 and the light guide plate 20. The liquid adhesive agent is injected into a space between the frame 100 and the light guide plate 20 so that the liquid adhesive agent is penetrated into the reflective sheet 40 positioned in the lower portion of the frame 100.

Then, the liquid adhesive is hardened so that the fixing member 80 is formed between the light guide plate 20 and the frame 100. The fixing member 80 makes contact with the reflective sheet 40 so that the reflective sheet 40 can be fixed to the frame 100.

Accordingly, when the light guide plate 20 makes contact with the frame 100, the reflective sheet 40 is simultaneously fixed to the light guide plate 20 and the frame 100.

Meanwhile, since an additional fixing unit such as an adhesive tape is not required in order to fix the reflective sheet 40 to the frame 100, a manufacturing process can be simplified, and the manufacturing cost can be reduced.

In addition, since the additional fixing unit such as the adhesive tape is not required, a slim and small-sized backlight unit can be realized.

Referring to FIG. 7, when the light guide plate 20 is coupled to the frame 100, the reflective sheet 41 is fixedly coupled to the light guide plate 20 and the frame 100 at the same time.

In particular, the reflective sheet 41 may be formed more widely than the frame 100. If the reflective sheet 41 is formed more widely than the frame 100, the reflective sheet 41 may be fixed onto the sidewalls 110 and 130 of the frame 100 while surrounding the lower portion of the frame 100.

In other words, the reflective sheet 41 may be fixed to the frame 100 by the fixing member 80 formed in the contact area between the light guide plate 20 and the frame 100.

Further, a portion of the reflective sheet 41 positioned on the sidewalls 110 and 130 of the frame 100, which is the outer peripheral surfaces of the frame 100, may be bonded to the frame 100 by using an adhesive member 70 such as an adhesive tape.

Accordingly, when the light guide plate 20 is bonded to the frame 100 by using the fixing member 80, the reflective sheet 41 is simultaneously fixed to the light guide plate 20 and the frame 200. At this time, the reflective sheet is additionally bonded to the sidewall of the frame 100, so that the adhesive strength of the reflective sheet 41 may be enhanced.

In the display device and a method for manufacturing the same according to the first embodiment, a backlight assembly is fixed to a frame by using a fixing member including resin. Accordingly, the coupling force between the backlight assembly and the frame is enhanced so that the reliability of the display device can be improved.

Further, when a thin backlight assembly is employed, since the thin backlight assembly is coupled to a frame by using a fixing member including resin, a slim and small-sized backlight unit can be realized.

In addition, according to the first embodiment, although a fixing member is used when a frame is coupled to a backlight assembly, the fixing member may be used even when a liquid crystal panel is coupled to the frame with the backlight assembly.

Hereinafter, a display device and a method for manufacturing the same according to the second embodiment will be described with reference to FIGS. 8 to 14.

Figure 8:
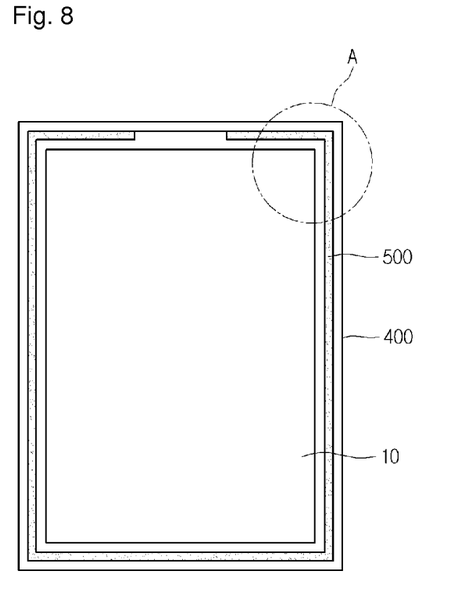
FIG. 8 is a plan view showing a display device according to the second embodiment.
Figure 9:
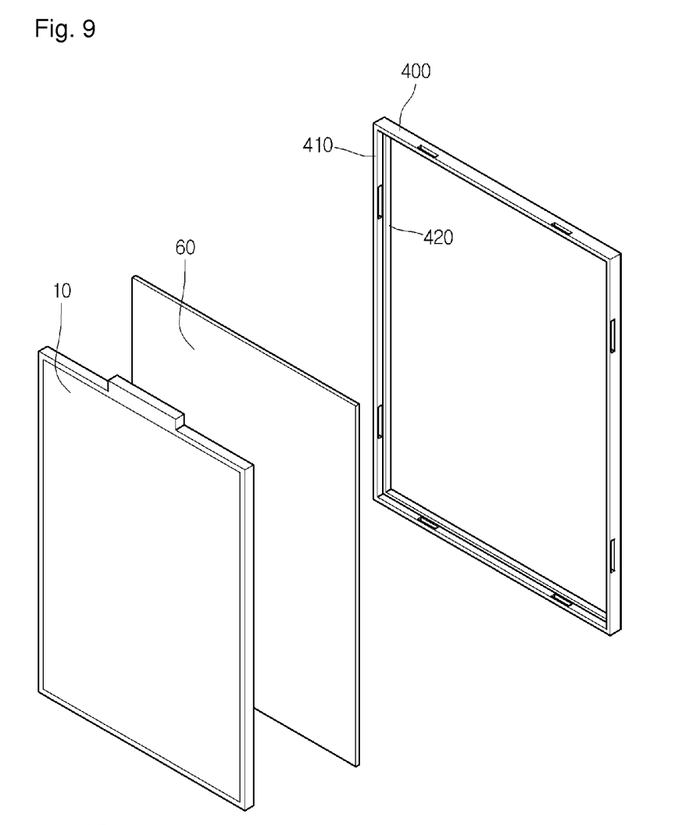
FIG. 9 is an exploded perspective view of a liquid crystal panel and a frame shown in FIG. 8.

FIG. 8 is a front view showing a display device according to the second embodiment, and FIG. 9 is an exploded perspective view of the display device shown in FIG. 8.

Referring to FIGS. 8 and 9, the display device comprises a liquid crystal panel 10, a backlight assembly 60, a frame 400, and a fixing member 500. The liquid crystal panel 10 and the backlight assembly 60 are identical to those of the first embodiment, and details thereof will be omitted.

The liquid crystal panel 10 and the backlight assembly 60 must be received and fixed. To this end, the frame 400 and the fixing member 500 are used.

The frame 400 is a square-type frame having opened front and rear portions so that the liquid crystal panel 10 and the backlight assembly 60 can be received and fixed. Although it is not shown in drawings, the frame 400 may be a square-type frame, only a front portion of which is opened. In the following description, the frame 400 having opened front and rear portions will be described as an example.

Since the liquid crystal panel 10 and the backlight assembly 60 have a square structure, the frame 400 according to the embodiment may be a square-type frame. However, according to the embodiment, the structure of the frame 400 is not limited to one shape.

The frame 400 includes a side surface support part 410 for supporting the side surfaces of the liquid crystal panel 10 and the backlight assembly 60, and a rear surface support part 420 vertically bent from the side surface support part 410 in order to support the rear surfaces of the liquid crystal panel 10 and the backlight assembly 60.

Since the frame 400 includes metal such as steel or alloy steel, the frame 400 may be formed thin.

If the liquid crystal panel 10 and the backlight assembly 60 are rested into the frame 400, the side surface support part 410 of the frame 400 makes contact with the side surfaces of the liquid crystal panel 10 and the backlight assembly 60, and the rear surface support part 420 makes contact with the boundary of the rear surface of the backlight assembly 60.

In this case, the frame 400 may be slightly larger than the liquid crystal panel 10 and the backlight assembly 60. Accordingly, a space may be created in the contact area between the frame 400 and the liquid crystal panel 10 and the backlight assembly 60. In order to enhance the coupling strength between the frame 400 and the liquid crystal panel 10 and the backlight assembly 60, the fixing member 500 is formed in the space.

The fixing member 500 is used to fix the liquid crystal panel 10 and the backlight assembly 60 onto the frame 400, and includes resin. For example, the fixing member 500 includes synthetic resin or silicon resin.

In particular, the silicon resin has superior heat resistance, water resistance, weather-resistance, and fouling resistance, and has superior elasticity even after the silicon resin is hardened.

Hereinafter, a scheme of coupling the frame 400 and the liquid crystal panel 10 and the backlight assembly 60 will be described.

The liquid crystal panel 10 and the backlight assembly 60 are rested into the frame 400. In addition, liquid-phase resin is injected into the space between the frame 400 and the liquid crystal panel 10 and the backlight assembly 60.

If the resin is hardened after predetermined time lapses, the side surface support part 410 and the rear surface support part 420 of the frame 400 adhere to the side surfaces and the rear surfaces of at least one of the liquid crystal panel 10 and the backlight assembly 60. Accordingly, the frame 400 can be coupled to the liquid crystal panel 10 and the backlight assembly 60 by the fixing member 500.

Figure 10:
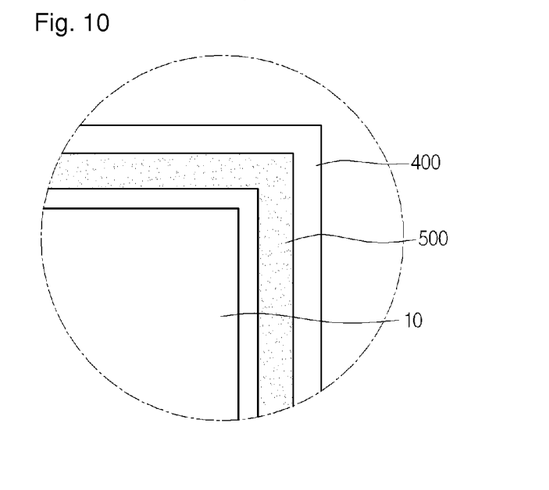
FIG. 10 is an enlarged view of an A area shown in FIG. 8.
Figure 11:
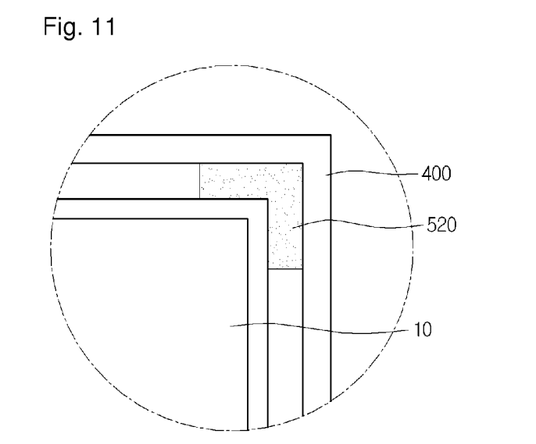
FIGS. 11 and 12 are views showing the fixing member that is located in various positions different from the position shown in FIG. 9.
Figure 12:
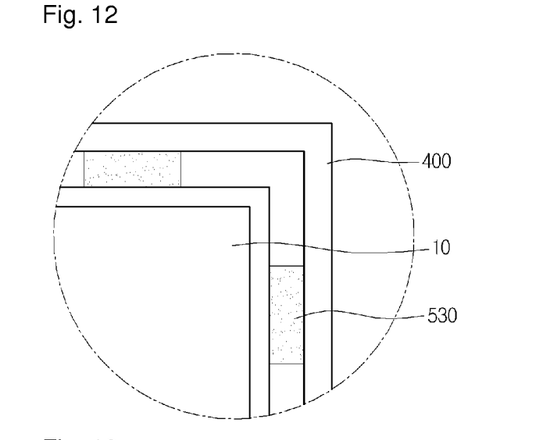

FIG. 10 is an enlarged view of an A area shown in FIG. 8, and FIGS. 11 and 12 are views showing the fixing member of FIG. 10 that is selectively formed.

Referring to FIG. 10, the fixing member 500 may be formed by injecting silicon resin into the entire side surfaces of the liquid crystal panel 10 after the liquid crystal panel 10 is mounted on the frame 400. Then, the liquid crystal panel 10 may be fixedly coupled to the frame 400 by using the fixing member 500.

Although it is not shown in the drawings, the backlight assembly 60 may be provided at the lower portion of the liquid crystal panel 10. Accordingly, the backlight assembly 60 may be fixed to the frame 400 together with the liquid crystal panel 10 by using the fixing member 500.

Referring to FIG. 11, a fixing member 520 can be formed in a corner area in which the liquid crystal panel 10 makes contact with the frame 400.

Silicon resin may be injected only into the corner area of the frame 400 after the liquid crystal panel 10 is mounted on the frame 400, thereby forming the fixing member 520.

Accordingly, the liquid crystal panel 10 can be fixedly coupled to the frame 400 by the fixing member 520.

Referring to FIG. 12, a fixing member 530 is selectively formed at the side surfaces except for the corner area of the liquid crystal panel 10 and the frame 400.

Silicon resin may be selectively injected into the side surfaces except for the corner area of the frame 400 after the liquid crystal panel 10 is mounted on the frame 400, thereby forming the fixing member 530.

Accordingly, the liquid crystal panel 10 can be fixedly coupled to the frame 400 by the fixing member 530.

Figure 13:
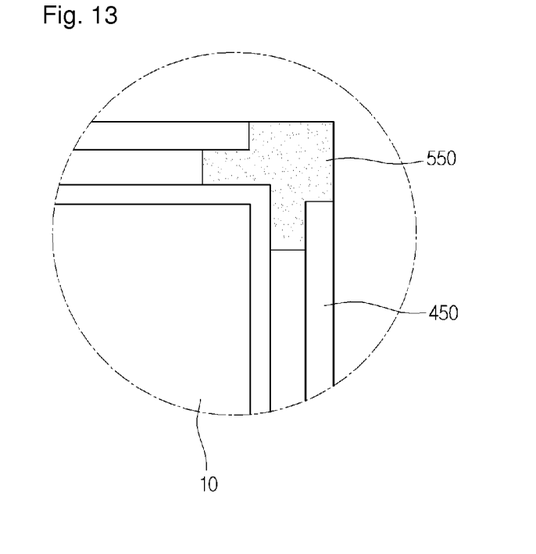
FIGS. 13 and 14 are views showing a frame and a fixing member having another shape according to the second embodiment.
Figure 14:
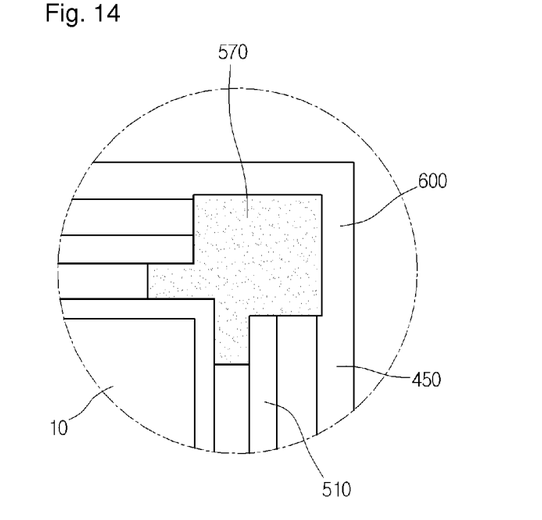

Referring to FIGS. 13 and 14, a frame 450 is formed as a square-shape frame, and may be formed with an opened corner area.

Referring to FIG. 13, silicon resin may be injected into the corner area of the liquid crystal panel 10 after the liquid crystal panel 10 is mounted on the frame 450, thereby forming a fixing member 550 to fill the opened corner area of the frame 450.

Accordingly, the fixing member 550 bonds the liquid crystal panel 10 with the frame 450. In addition, the fixing member 550 fills the opened corner area of the frame 450, so that the strength of the frame 450 can be more enhanced.

Referring to FIG. 14, silicon resin is injected into a corner area of the liquid crystal panel 10 after the liquid crystal panel 10 is mounted on the frame 450, thereby forming a fixing member 570. In this case, the fixing member 570 may protrude out of the opened corner area of the frame 450.

Accordingly, the fixing member 570 bonds the liquid crystal panel 10 with the frame 450. In addition, the fixing member 570 protrudes out of the opened corner area of the frame 450 to protect the liquid crystal panel 10 when an external structure such as a case 600 is mounted outside the frame 450.

In other words, the fixing member 570 protrudes outward the frame 450 to absorb the shock occurring when the frame 450 makes contact with the case 600, so that the fixing member 570 can protect the liquid crystal panel 10.

Although the fixing member 570 is formed in the corner area of the frame 450 and the liquid crystal panel 10 as an example in the drawings, the fixing member 570 may be entirely or selectively formed at the side surfaces of the liquid crystal panel 10 and the frame 450.

In a display device and a method for manufacturing the same according to the second embodiment, since a frame, into which a liquid crystal panel and a backlight assembly are received and fixed, includes a chassis, which is coupled to an existing mold frame in order to enhance the strength of the mold frame, the thickness of the display device can be reduced by the thickness of the mold frame.

Further, in the display device, silicon resin is injected into the frame on which the liquid crystal panel and the backlight assembly are mounted, so that the frame can be coupled to the liquid crystal panel and the backlight assembly. Accordingly, since a conventional mold frame forming process and a conventional chassis coupling process, or a conventional chassis insertion process are omitted, a manufacturing process is simplified so that the manufacturing time can be saved, and the manufacturing cost can be reduced.

In addition, the display device can be protected from an external shock by a fixing member interposed between the frame and the backlight assembly and the liquid crystal panel. This is because the fixing member includes silicon resin having an elastic force. Accordingly, even if the liquid crystal panel and the backlight assembly are shocked, the liquid crystal panel and the backlight assembly are primarily protected by the frame, and secondarily protected by the elastic force of the fixing member positioned inside the frame. Especially, the fixing member formed between a steel frame and the liquid crystal panel and the backlight assembly serves as a cushion, so that the display device can be more safely protected.

In addition, since the backlight assembly and the liquid crystal panel are coupled to the frame by the fixing member including resin, the manufacturing time can be saved, and the manufacturing cost can be reduced. In detail, since a conventional taping process, which is employed to fix a liquid crystal panel onto a mold frame on which a backlight assembly is mounted, is omitted, the manufacturing process is simplified so that the manufacturing cost can be reduced.

Any reference in this specification to "one embodiment", "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The embodiment relates to a display module.
The invention claimed is:
1. A display device comprising:
   a display part comprising at least one of a liquid crystal panel and a backlight assembly;
   a frame receiving the display part; and
   a fixing member disposed between an outside surface of the display part and an inside surface of the frame,
   wherein one side surface of the fixing member is contacted with the inside surface of the frame and another side surface of the fixing member is contacted with the outside surface of the display part,
   wherein the frame comprises,
   a side surface support part that supports a side surface of the display part;
   a rear surface support part that supports a lower portion of the display part; and
   a first zigzag protrusion formed on a side surface support part in order to increase the coupling force between the fixing member and the frame, and
   wherein the rear surface support part has an opened structure.

2. The display device as claimed in claim 1, wherein the frame comprises metal or synthetic resin, and the fixing member comprises resin.

3. The display device as claimed in claim 1, wherein the fixing member is entirely or selectively formed between the frame and the display part.

4. The display device as claimed in claim 1, wherein the frame is formed as a square frame having an opened corner part, and the fixing member is formed in a corner area formed between the frame and the display part.

5. The display device as claimed in claim 4, wherein the fixing member formed at the corner area of the frame protrudes beyond a sidewall of the frame.

6. The display device as claimed in claim 5, further comprising a case mounted on an outer peripheral surface of the frame and the fixing member.

7. The display device as claimed in claim 1, wherein the fixing member is formed at a corner area or a side portion of the frame and the display part.

8. The display device as claimed in claim 1, wherein the backlight assembly comprises a reflective sheet, and the reflective sheet is positioned at a lower-most portion of the backlight assembly and bonded by the fixing member.

9. The display device as claimed in claim 1, further comprising a second zigzag protrusion formed on a portion of an outer peripheral surface of the backlight assembly in order to increase coupling force between the fixing member and backlight assembly.

10. A display device comprising:
    a backlight assembly including a light guide plate, an optical sheet, and a reflective sheet; and
    a frame formed with a sidewall to receive and fix the backlight assembly, in which at least one portion of the backlight assembly is fixed to the frame by using a fixing member,
    wherein the fixing member is disposed between an outside surface of the backlight assembly and an inside surface of the frame,
    wherein one side surface of the fixing member is contacted with the inside surface of the frame and another side surface of the fixing member is contacted with the outside surface of the backlight assembly,
    wherein the sidewall of the frame comprises
    a side support part that supports a sidewall of the backlight assembly;
    a rear surface support part that supports a lower portion of the backlight assembly and is bent from the side support part; and
    a first zigzag protrusion formed on a side surface support part in order to increase the coupling force between the fixing member and the frame, and
    wherein the rear surface support part has an opened structure.

11. The display device as claimed in claim 10, wherein the frame comprises metal or synthetic resin, and the fixing member comprises resin.

12. The display device as claimed in claim 10, wherein at least one protrusion is formed at a side surface of the light guide plate.

13. The display device as claimed in claim 12, wherein a groove is formed at an inner peripheral surface of a sidewall of the frame corresponding to the protrusion of the light guide plate.

14. The display device as claimed in claim 10, wherein the fixing member is provided between the light guide plate and the frame.

15. The display device as claimed in claim 14, wherein the reflective sheet is fixed to a lower surface of the frame and the fixing member.

16. The display device as claimed in claim 10, wherein the reflective sheet is provided to surround a bottom surface and an outer peripheral surface of a sidewall of the frame, and is fixed to the outer peripheral surface of the sidewall of the frame by using an adhesive tape.

17. The display device as claimed in claim 10, further comprising a second zigzag protrusion formed on a portion of an outer peripheral surface of the backlight assembly in order to increase coupling force between the fixing member and backlight assembly.

* * * * *